(12) United States Patent
Sands (10) Patent No.: US 12,447,782 B2
(45) Date of Patent: Oct. 21, 2025

(54) DUAL PURPOSE VEHICLE

(71) Applicant: Government of the United States as represented by the Secretary of the Air Force, Wright-Patterson AFB, OH (US)

(72) Inventor: Isaac Sands, Ossian, IN (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 835 days.

(21) Appl. No.: 17/740,577

(22) Filed: May 10, 2022

(65) Prior Publication Data
US 2023/0364954 A1    Nov. 16, 2023

(51) Int. Cl.
| | |
|---|---|
| *B60D 1/00* | (2006.01) |
| *B60D 1/28* | (2006.01) |
| *B64D 1/06* | (2006.01) |
| *F41A 9/87* | (2006.01) |

(52) U.S. Cl.
CPC ............... *B60D 1/28* (2013.01); *B64D 1/06* (2013.01); *F41A 9/87* (2013.01)

(58) Field of Classification Search
CPC .... F41A 9/87; B60D 1/28; B60D 1/04; B60D 1/06; B64D 1/06; B64D 1/04
See application file for complete search history.

(56) References Cited

U.S. PATENT DOCUMENTS

| | | | | |
|---|---|---|---|---|
| 2,999,693 | A * | 9/1961 | Thorson | F41A 9/87 280/492 |
| 3,837,674 | A | 9/1974 | Rathsack | |
| 3,858,730 | A * | 1/1975 | Oswald | F41A 9/87 180/242 |
| 4,281,583 | A * | 8/1981 | Pollock | F41A 9/87 89/33.14 |
| 4,379,569 | A | 4/1983 | Koch | |
| 4,625,944 | A * | 12/1986 | Mankey | B66F 7/08 254/8 R |
| 5,083,892 | A * | 1/1992 | Oswald | B60P 3/00 414/458 |
| 6,634,667 | B1 | 10/2003 | Tozer | |
| 6,935,818 | B2 * | 8/2005 | Hoeper | B62D 21/20 410/49 |
| 7,527,309 | B2 | 5/2009 | Smidler | |
| 7,677,587 | B2 * | 3/2010 | Fisk | B60D 1/04 280/445 |
| 8,893,604 | B1 * | 11/2014 | Gray | F41H 11/16 89/1.13 |
| 2007/0257470 | A1 | 11/2007 | Konsela | |

* cited by examiner

*Primary Examiner* — Steven O Douglas
(74) *Attorney, Agent, or Firm* — AFMCLO/JAZ; Larry L. Huston (57) ABSTRACT

A jammer which eliminates the need for a bobtail in a forward deployment. The jammer has an outwardly extending boom with a table at the distal end of the boom. The table can mount upwardly extending cradles suitable for temporarily holding cargo, such as a munition, during transport and positioning on the underside of an aircraft wing. The table also holds an upstanding pintle hook. The pintle hook provides for attachment of the jammer to a trailer for towing. Using the jammer for both towing of a trailer and positioning of cargo using the boom eliminates the need for a bobtail, conserving both cargo space and payload weight during deployment.

20 Claims, 8 Drawing Sheets

DUAL PURPOSE VEHICLE

STATEMENT OF GOVERNMENT INTEREST

The invention described and claimed herein may be manufactured and used by or for the Government of the United States of America for all government purposes without the payment of any royalty.

FIELD OF THE INVENTION

The present invention relates to munition loading vehicles and more particularly to dual purpose munition loading vehicles.

BACKGROUND OF THE INVENTION

Agile combat in a forward deployment must balance competing, dynamic and often unknown interests. Different types of vehicles are typically deployed, each with a specific and dedicated task, for which that vehicle was specifically designed.

For example, a vehicle such as a bobtail is used to tow, maneuver and deliver loads to specific locations. A typical bobtail comprises an open forward cap and open bed in a straight axle configuration. Supplies can be loaded onto the open bed. If the bed reaches capacity, supplies can be loaded onto a trailer which the bobtail pulls.

The bobtail can also tow various supply trailers from a cargo plane to a staging area and from the staging area to the active sites as needed. A common trailer is an open munition trailer. The open munition trailer has a tow bar for connection to the bobtail and has munitions stacked in multiple tiers perpendicular to the tow bar. bobtail has a bumper mounted horizontally extending pintle for attachment to the tow bar or other towing configurations. But this arrangement has the disadvantage that the bobtail is a single use vehicle—for towing aircraft ground equipment, such as munitions trailers.

Once the munition trailer is towed to the appropriate site, a jammer unloads the munitions from the trailer for installation on an aircraft. A typical jammer, such as a MJ-1 or MHU-83 jammer, is a vehicle having an open cab and cantilevered forward boom. The boom is operable from the cab with up/down capability.

The jammer is driven to the appropriate site for munition retrieval and delivery. The boom then retrieves a munition from the top tier of the munition trailer, with the munition being placed on a table disposed at or near the distal end of the boom. The jammer then drives to the respective aircraft where the boom places the munition proximate to and underneath the plane. Skilled field personnel then load the munition to the plane. This process has been used since the 1950's without significant modification or updates as relates to the present invention.

In the present state of the art, a bobtail and jammer are both necessary to move trailers to load items to the underside of the aircraft wing, respectively. But cargo space and weight are constrained when equipment is deployed for agile combat. Even since the 1950's, all military cargo planes have constraints for volume and weight. Each ground vehicle deployed for a specific purpose displaces an equal volume/weight of other equipment in the cargo plane. Each single use vehicle that can be eliminated without loss of functionality allows other needed cargo to be transported to forward deployment on that cargo plane. It can be seen there is a long felt need to conserve weight/volume on forward deployment cargo planes, without undermining munition handling capability.

SUMMARY OF THE INVENTION

In one embodiment the invention comprises a jammer suitable for loading/unloading a munition to/from an underside of an aircraft wing. The jammer comprises an articulable boom cantilevered from a proximal end to a remote distal end, a table able juxtaposed with the distal end of said boom, the table being configured to have an upwardly extending cradle mounted thereto and have an upwardly extending pintle hook joined to said table. The cradle is suitable for placement and removal of munitions and other aircraft parts thereon. The pintle hook is suitable for use in towing a trailer. In another embodiment the invention comprises a method of repositioning a trailer without the use of a bobtail. The method comprises the steps of providing a jammer having an outwardly extending boom, the boom extending from a proximal end to a distal end remote therefrom; extending the boom to a position ergonomically suitable for attaching accessories thereto; attaching a jammer table to the boom, whereby the jammer table is juxtaposed with the distal end of said boom; attaching a pintle hook to the table; driving the jammer to a trailer disposed at a first location; attaching the trailer to the pintle hook and without using a bobtail, driving the jammer to a second location while towing said trailer behind said jammer.

DETAILED DESCRIPTION OF THE INVENTION

Figure 1:
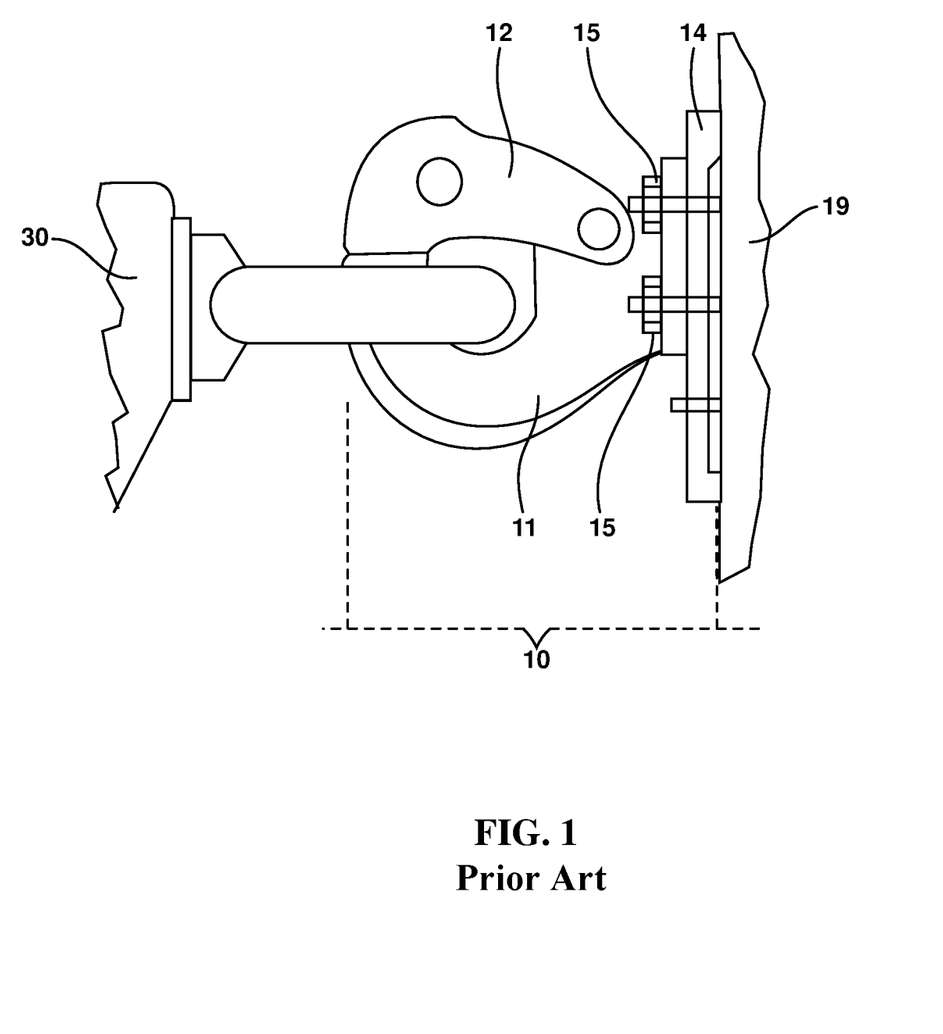
FIG. 1 is a fragmentary side elevational view of a pintle hook mount according to the prior art attached to a trailer for towing.

Referring to FIG. 1, a pintle hook 10 according to the prior art, is typically bumper 19 mounted on the front of a bobtail, commonly referred to as a tug. The pintle hook 10 attaches to the tow bar 31 of a munition 32 trailer 30 for relocation by the bobtail (not shown).

The pintle hook 10 typically comprises a mounting plate 14 which attaches to the bumper 19 or other mounting surface. The mounting plate 14 may be generally rectangular with a through hole juxtaposed with each of the four corners. Threaded fasteners 15 are inserted through the holes for attachment to the mounting surface. Alternatively, the mounting plate 14 may be welded to the mounting surface. The pintle hook 10 has a fixed towing horn 11 protruding outwardly from a proximal end juxtaposed with the mounting plate 14 to a distal end remote therefrom. The towing horn 11 may be integrally cast or forged with the mounting plate 14 or may be removably attached thereto with threaded fasteners 15. An articulating latch 12 extends outwardly from a proximal end juxtaposed with the proximal end of the towing horn 11 to a distal end remote therefrom. The articulating latch 12 articulates from an open position for inserting trailer 30 towing apparatus parts to a closed position for transport. In the closed position the distal ends of the towing horn 11 and latch 12 meet, forming a loop for the trailer 30 towing apparatus parts. Optionally, the latch 12 may have a lock 13, to prevent inadvertent opening during use.

Figure 2:
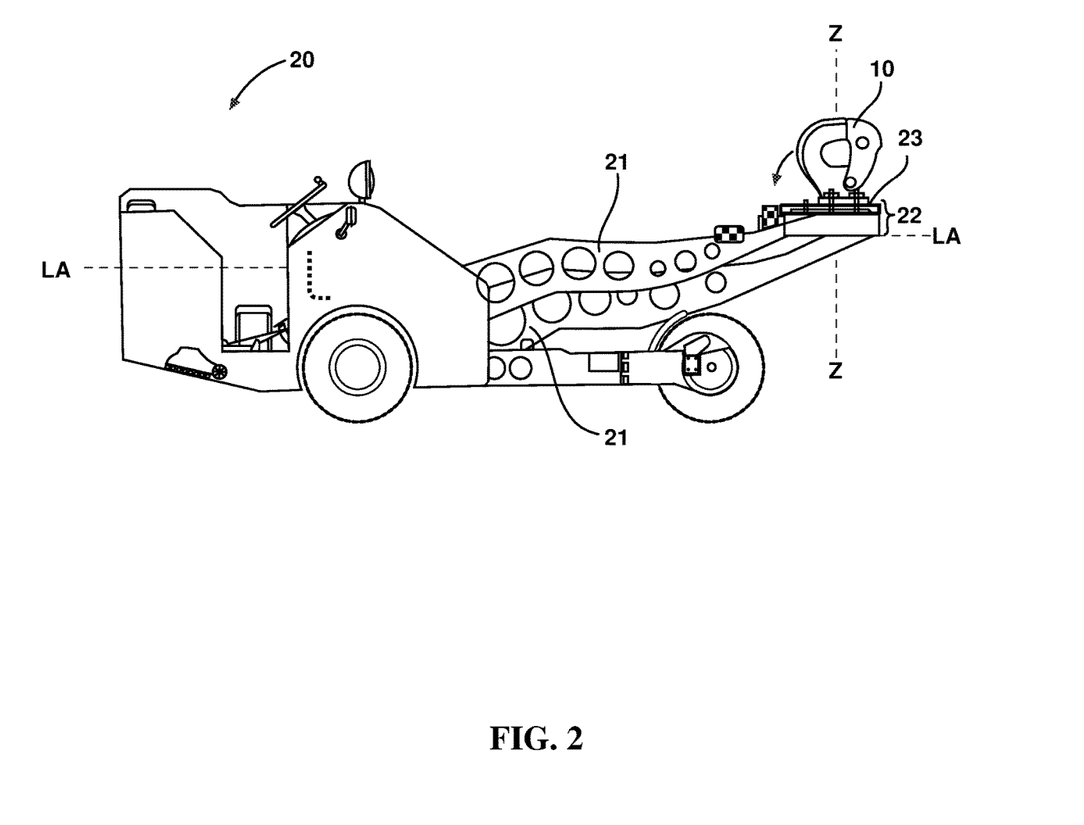
FIG. 2 is a side elevational view of a jammer according to the present invention.

Referring to FIG. 2 a typical jammer 20 according to the present invention comprises an aerial lift truck that lifts and secures munitions 32 such as weapons, rocket launchers and other items to or from the underside of an aircraft wing. The jammer 20 is self propelled, typically powered by a diesel engine, and has a cantilevered boom 21. The boom 21 extends outwardly, typically forwardly, from a proximal end juxtaposed with the body of the jammer 20 to a distal end remote therefrom.

A table 22 is juxtaposed with and preferably disposed at the distal end of the boom 21 for supporting hardware as set forth below. The table 22 forms an XY plane with a mutually perpendicular Z axis. The table 22 may be rotatable about the Z axis. The table 22 has a front edge facing towards the forward direction of the jammer 20, an opposed back edge facing towards the back of the jammer 20 and two opposed side edges therebetween. In a degenerate case, the table 22 is rectangular and the side edges are longitudinally parallel, although the invention is not so limited.

The table 22 has a top surface 23 for removable attachment of various upstanding cradles 26. The cradles 26 accept complementary pylons, ordinance, electronics, engines, engine components, etc. for attachment to or removal from the underside of the aircraft wing.

The boom 21 typically comprises two parallel four link mechanisms, so that the table 22, mounted onto the boom 21 as the floating link, can remain parallel to the ground and generally horizontal during raising and lowering of the boom 21. The boom 21 defines a longitudinal axis parallel to and midway between the parallel four link mechanisms. The table 22 is mountable to the boom 21 at four pivot points. The pivot points may comprise holes for receiving pivot pins from the boom 21 or, alternatively, or pins insertable into pivot holes on the boom 21. The pivot points are disposed in two longitudinally aligned pairs, with one pair on each side of the table 22. In a first embodiment, such as a MH-1 jammer 20, each four link mechanism is mounted to the underside of the table 22, with the front and back of the table 22 being pivotably mounted to the input and output links of the respective four link mechanism. In a second embodiment, such as a MHU-83 jammer 20, opposed top and bottom edges of each side the table 22 are pivotably mounted to the respective input and output links of respective four link mechanisms.

In one embodiment, the boom 21 may have a range of about 4.5 M above ground to 0.7 M below ground and 3100 Kg. lift capacity. The present invention may also be used with a smaller embodiment, such as an MJ-1 jammer 20 having a 1360 Kg. lift capacity and a lift range of almost 2 M above ground level, and having similar features in all relevant aspects.

Figure 3A:
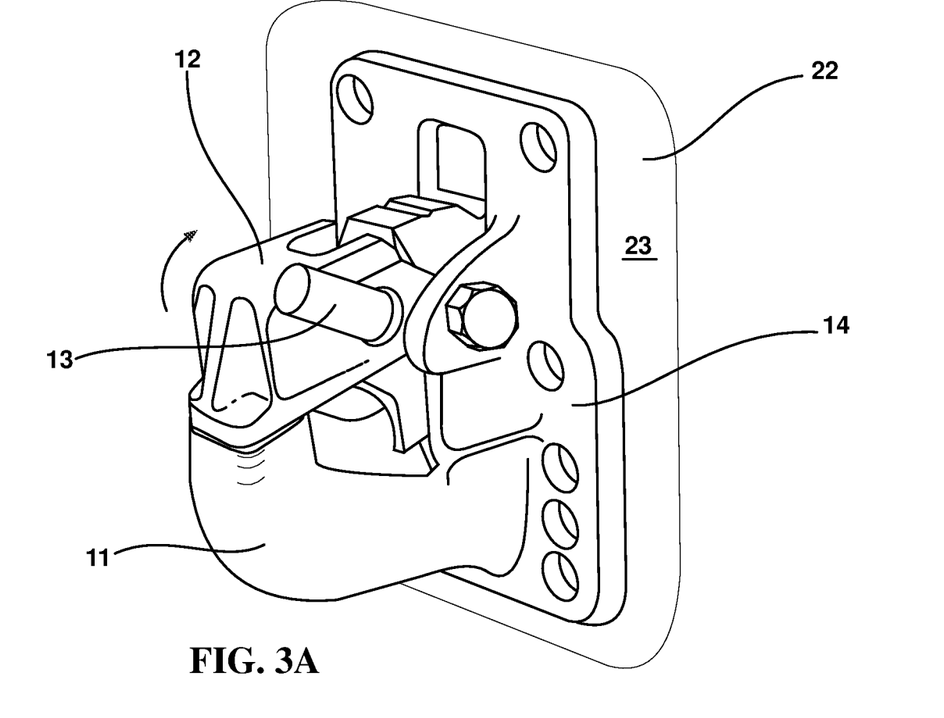
FIG. 3A is a perspective view of a closed flat latch pintle hook according to the present invention, the latch opening in the direction of the arrow and the threaded fasteners omitted for clarity.
Figure 3B:
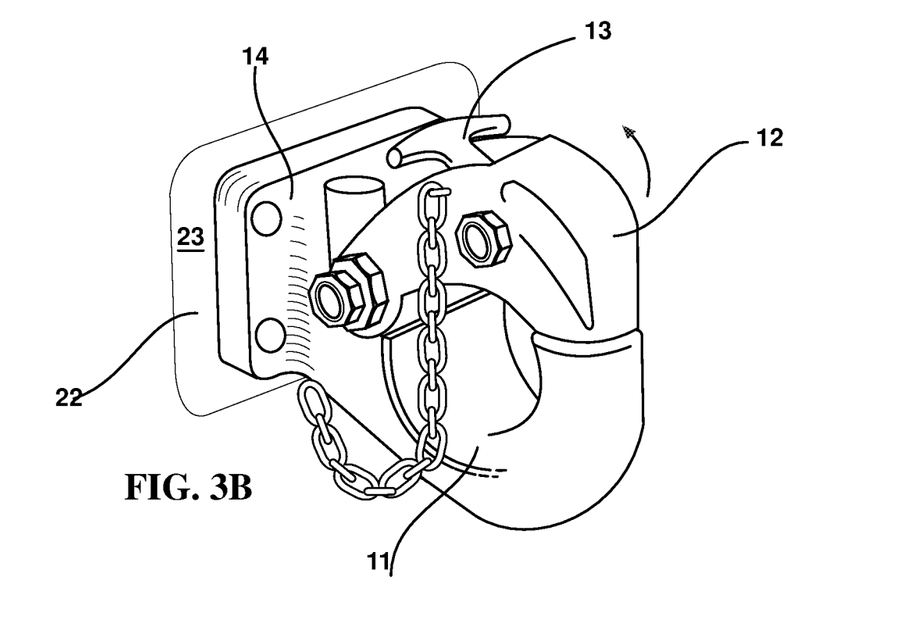
FIG. 3B is a perspective view of a closed c-shaped pintle hook according to the present invention, the latch opening in the direction of the arrow and the threaded fasteners omitted for clarity.
Figure 3C:
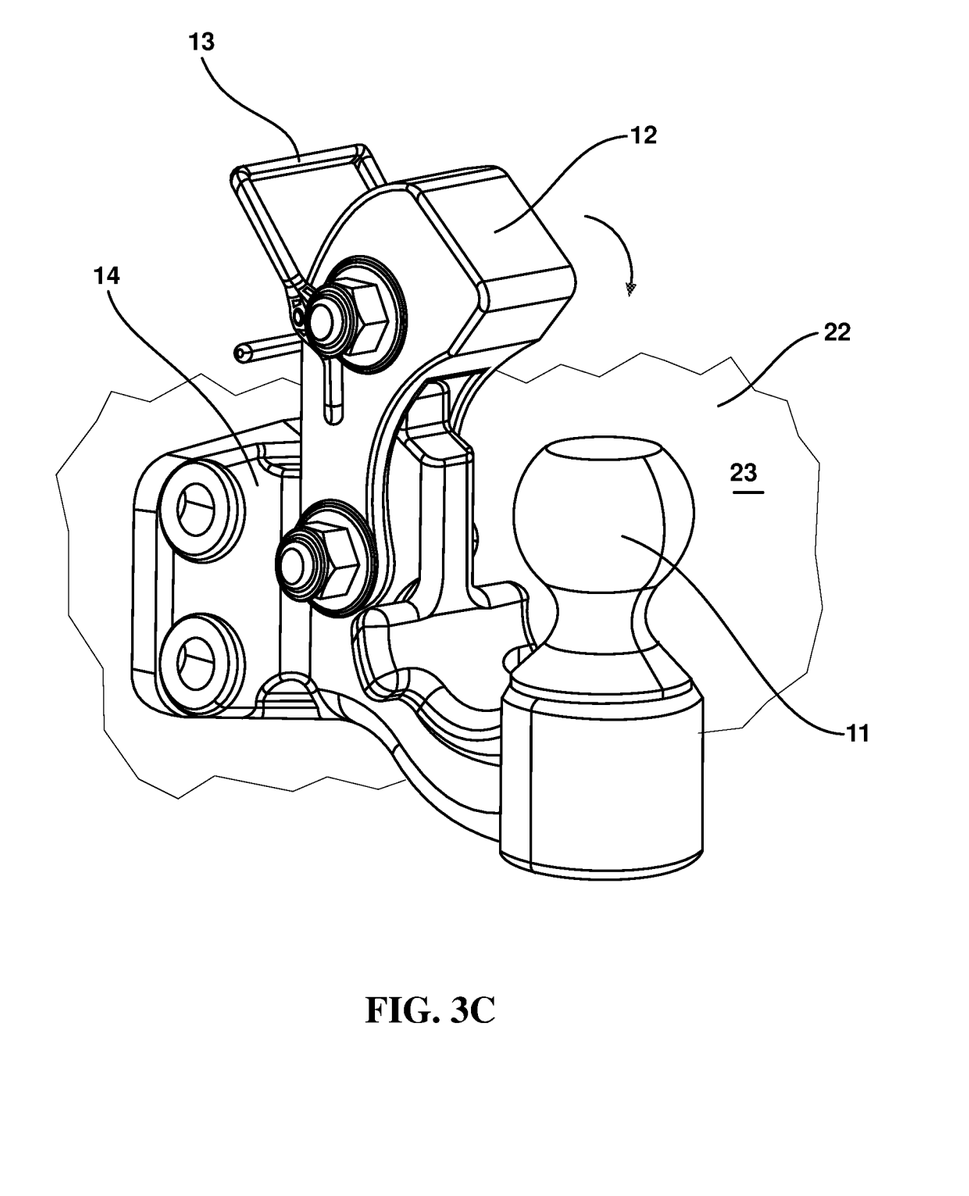
FIG. 3C is a perspective view of an open ball and socket pintle hook according to the present invention, the latch closing in the direction of the arrow and the threaded fasteners omitted for clarity.

Referring to FIG. 3A, FIG. 3B and FIG. 3C, the loop of the latch 12 and horn 11 defines a plane of the pintle hook 10. Preferably the plane of the pintle hook 10 is parallel to the towing direction, to reduce bending of the pintle hook 10 during off-axis towing. Bending superimposes bending stresses with the tensile stresses inherent with towing, reducing towing capacity and possibly leading to premature failure. In a degenerate case, the plane of the pintle hook 10 is longitudinally parallel and towing occurs in the longitudinal direction, except for routine turns en route to the trailer 30 destination.

Figure 4A:
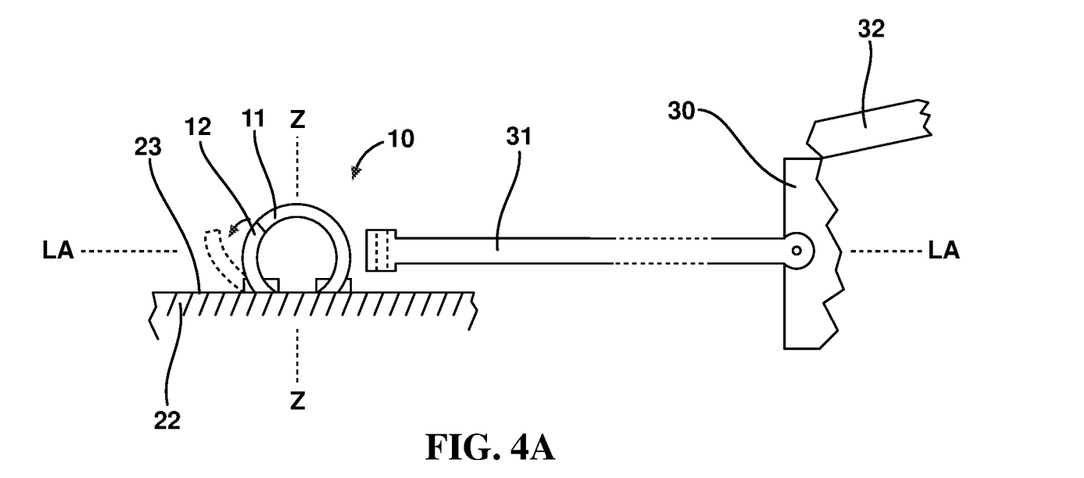
FIG. 4A is a schematic side elevational view of a pintle hook on a jammer table according to the present invention, the tow bar being shown without connection to the pintle hook.
Figure 4B:
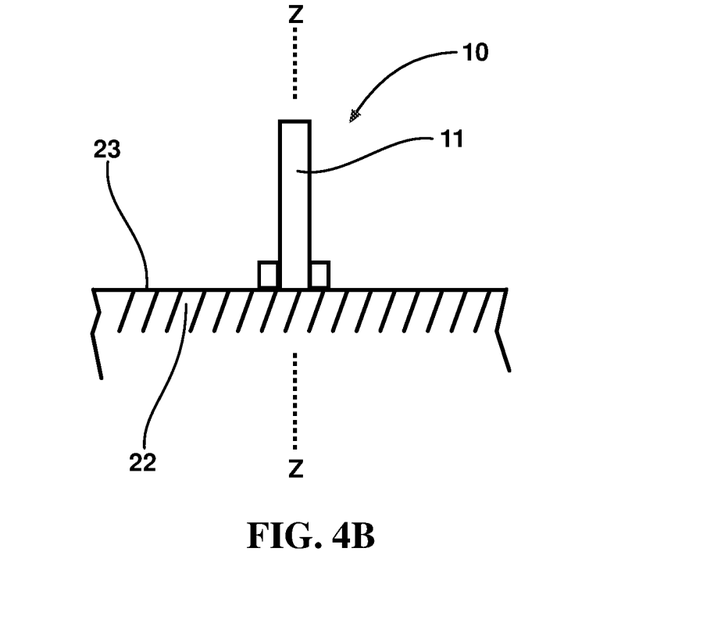
FIG. 4B is a schematic front elevational the pintle hook and jammer table of FIG. 4A, the tow bar being omitted for clarity.

Referring to FIG. 4A and FIG. 4B, a pintle hook 10 is permanently or preferably removably attached to the table 22. As used herein, such attachment includes both direct attachment to the table 22 (with or without a bridge 50 described below) and attachment through an intermediate component such as an adapter 40, as described below.

The pintle hook 10 extends vertically from the table 22 in the Z direction, and is preferably disposed within the footprint of the table 22 to reduce interference in close quarters. The loop may be perpendicular to the longitudinal axis of the boom 21, for secure attachment of towing equipment. The boom 21 may be longitudinally extended and the top surface 23 of the table 22 is disposed at an elevation convenient for ground personnel to perform maintenance, attachment/removal of towing connections, etc. Particularly, the latch 12 may be opened and a tow hook, clevis, eye of a tow bar 31, etc. may be attached to the pintle hook 10 in known fashion. The latch 12 is closed and optionally locked for security. With the jammer 20 now connected to a trailer 30, the jammer 20 can deliver the trailer 30 to a desired location without the use of a bobtail. The space, weight and subsequent maintenance of the bobtail are obviated and forward deployment carries on with a leaner, but equally effective, equipment inventory. If the trailer 30 is disposed in close quarters and not directly accessible by a bobtail with a bumper 19 mounted pintle, then mission efficacy can even be improved.

Figure 5:
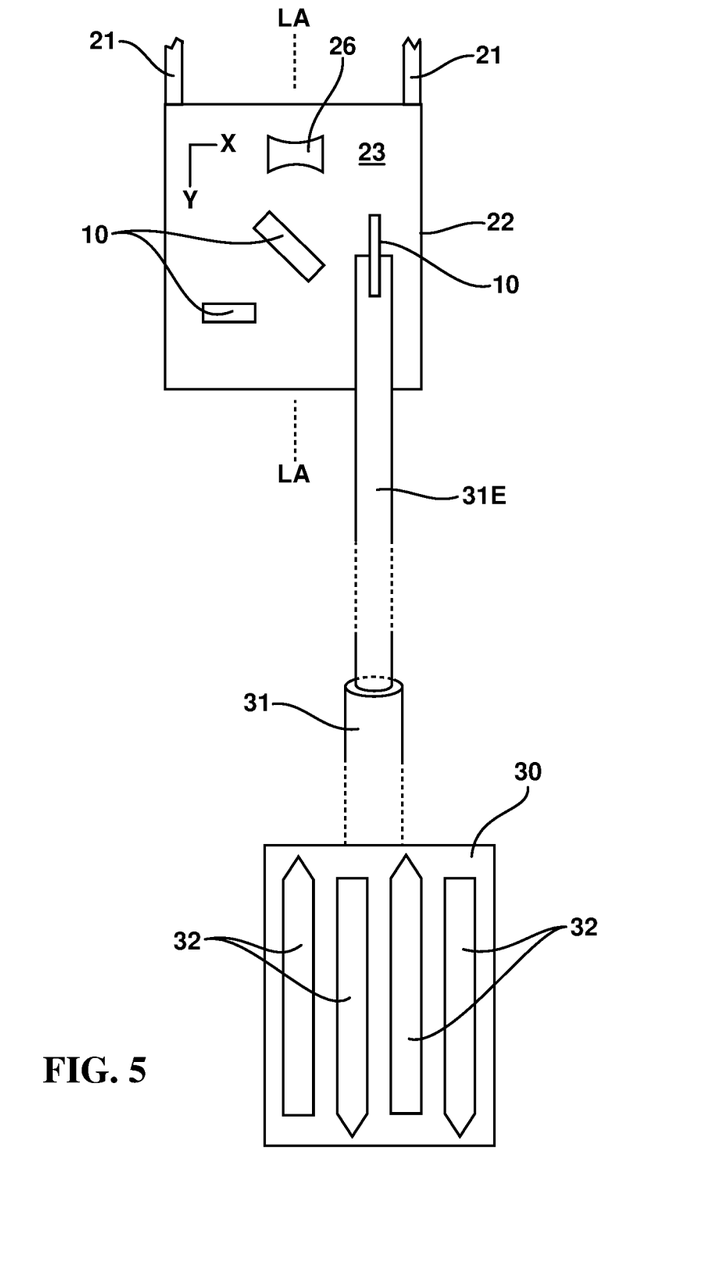
FIG. 5 is a schematic top plan view of an alternative embodiment of a jammer table having plural sized pintle hooks in various azimuthal orientations, the longitudinally parallel pintle hook having a tow bar attached to a trailer.

Referring to FIG. 5, if desired the table 22 may comprise plural and mutually different attached pintle hooks 10. This arrangement provides for towing trailers 30 with different towing connections. If desired, one or more pintle hooks 10 may have different azimuthal orientations. This arrangement provides the benefit that trailers 30 which are not longitudinally aligned with the boom 21, due to challenging forward deployment conditions, can be towed with a pintle hook 10 aligned with the towing angle. As noted above, it is preferable to tow trailers 30 in line with the plane of the pintle hook 10, to reduce bending stresses and unduly limit capacity.

The trailer 30 has a hitch for attachment to the pintle hook 10. Attachment includes both direct attachment and connection through intermediate components, such as a chain or tow bar 31. A tow bar 31 may comprise an elongate webbing made of nylon or polyester, as is known to one of skill. As used herein a hitch includes various embodiments such as a ball and socket joint, closed loop, open hook, clevis, etc.

Figure 6:
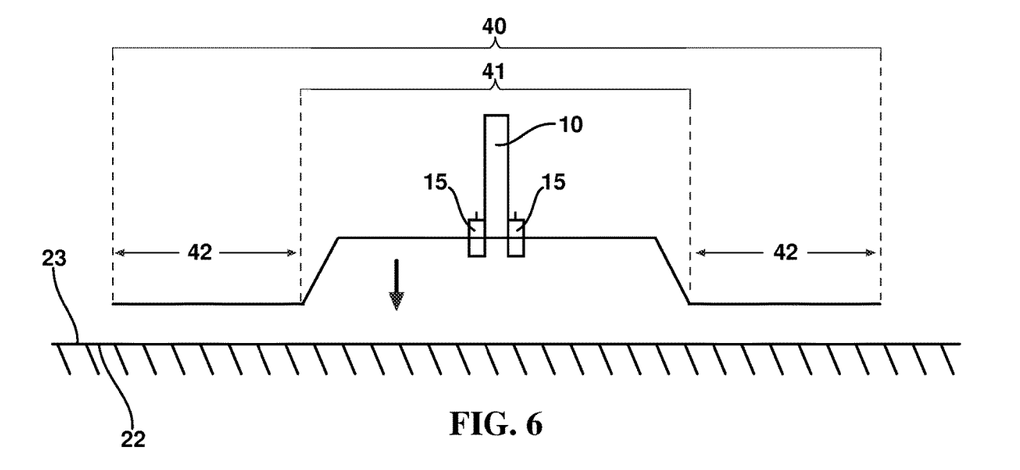
FIG. 6 is an exploded schematic frontal elevational view of an alternative embodiment of a table having a pintle hook attached to an adapter which, in turn is attachable to the jammer table.

Referring to FIG. 6, if desired the pintle hook 10 may be attached to an adapter 40, which in turn, is attached to the table 22. The adapter 40 may have three trisections 41, 42, in cross section, comprising a central trisection 41 and two outboard trisections 42 extending symmetrically and outwardly therefrom. Each outboard trisection 42 is in mutually acute angular relationship with the central trisection 41, so that the outboard trisections 42 can rest upon the table 22 with the central trisection 41 elevated above the table 22.

This arrangement provides the benefit that existing tables 22 may be used without drilling and tapping holes for the specific geometry of the pintle hook 10 mounting plate 14 holes. Instead, the central trisection 41 of the adapter 40 may have holes which match the holes in the mounting plate 14. The outboard trisections 42 may have holes which already available in the table 22. In use, the pintle hook 10 is attached to the central trisection 41 and extends upwardly in the Z direction. Alternatively, the pintle hook 10 may extending downwardly, if there is sufficient clearance between the central trisection 41 and the top surface 23 of the table 22.

In use, the pintle hook 10 is attached to the central trisection 41 and the outboard trisections 42 are attached to the table 22. This arrangement preserves the original configuration of the table 22, and allows sheet steel to be used for the adapter 40.

Figures 6A, 6B:
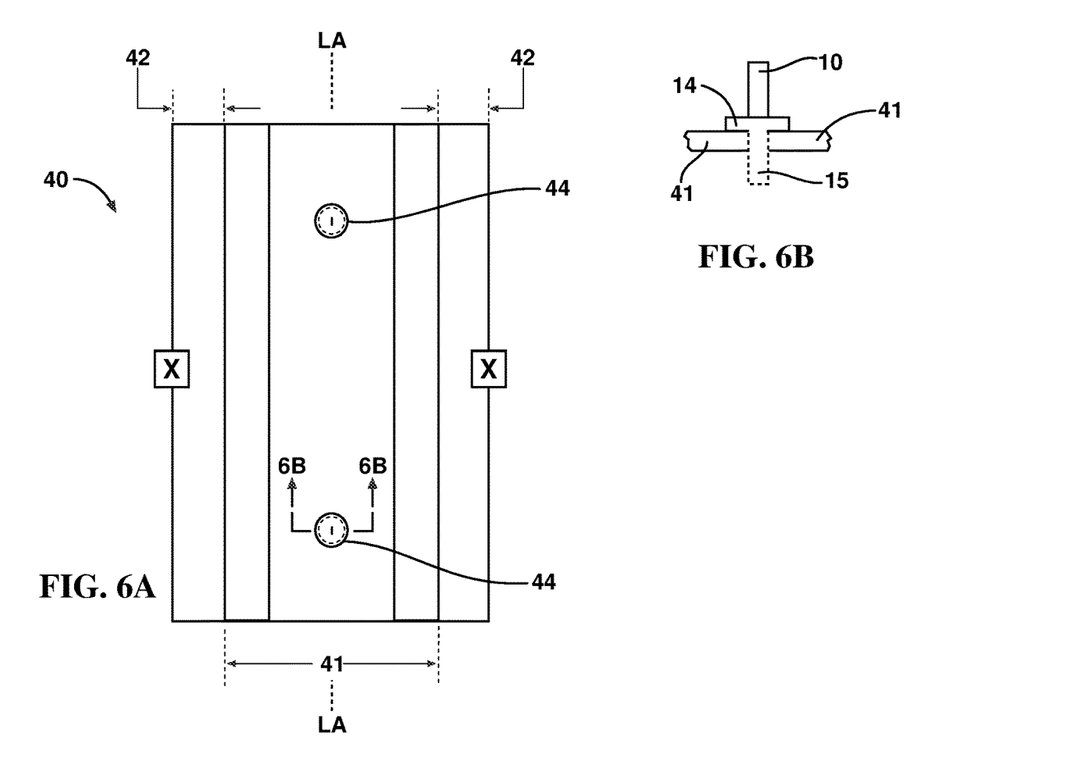
FIG. 6A is a schematic top plan view of an adapter having tapped lug holes without a pintle hook attached.
FIG. 6B a schematic, fragmentary front elevational view taken along lines 6B-6B in FIG. 6A and having a pintle hook inserted into the tapped hole of the adapter.

Referring to FIG. 6A and FIG. 6B, a typical adapter 40 has lug holes 44 which are drilled and tapped into the central trisection 41. The lug holes 44 are used to attach threaded lugs (not shown) for securing cargo to the adapter 40. The lug holes 44 are preferably through holes, but may be blind holes, if desired. A lug is unscrewed and set aside. A pintle hook 10 is provided. The pintle hook 10 has a screw thread 15 extending rearwardly from the mounting plate 14 and securely affixed thereto. The screw thread 15 is sized to fit into the tapped lug hole 44 in the adapter 40.

The pintle hook 10 is screwed into the tapped lug hole 44 and tightened. If desired, a jam nut may be provided on the underside of the adapter for security. The tow bar 31 may then be attached to the pintle hook 10.

Oftentimes a jammer 20 is nuclear certified, i.e. certified to handle nuclear munitions 32. Any permanent change to a nuclear certified jammer is time-consuming and costly. Permanent changes include drilling new holes, resizing existing holes and permanently attaching new items, such as a pintle hook 10. The embodiments of FIG. 6 overcomes this problem by not requiring permanent attachment of the pintle hook 10 to the jammer 20 table 22. Instead, the pintle hook 10 may be attached to the adapter 40, which, in turn, is attached to the top surface 23 of the table 22 without modification or the need for recertification.

Likewise the embodiment of FIG. 6A and FIG. 6B provides for attachment of the pintle hook 10 to the top surface 23 of the table 22 without recertification. These embodiments advantageously avoid time-consuming and costly recertification, maintains the flexibility of the present invention and still obviates the need for a bobtail and its attendant weight and cargo space.

Figure 7:
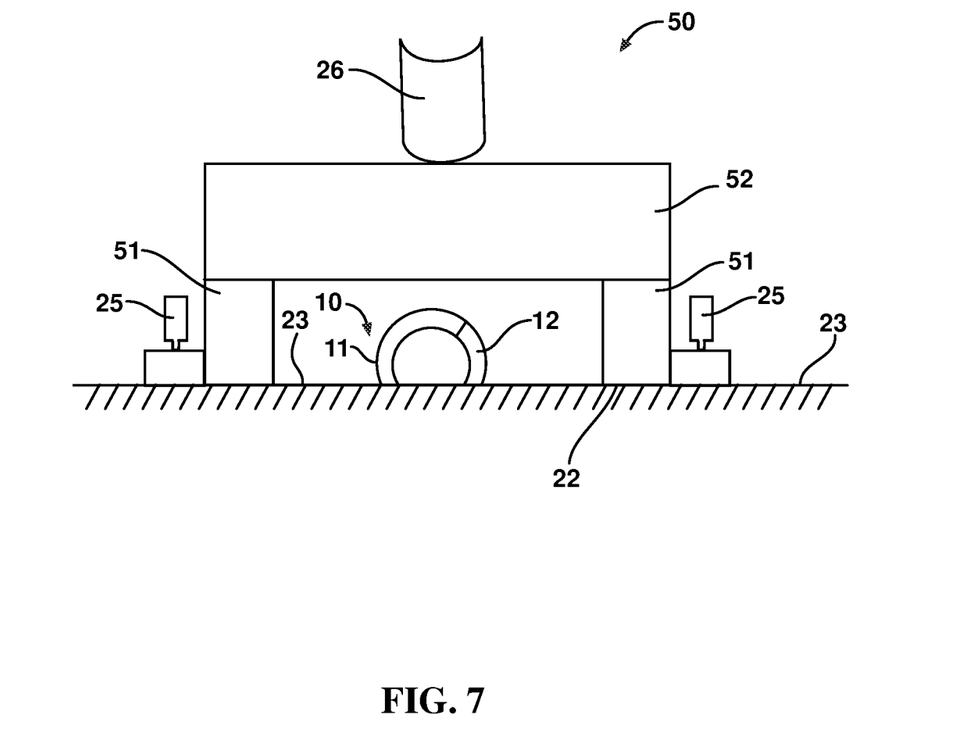
FIG. 7 is a schematic frontal elevational view of an alternative embodiment of a table having a pintle hook attached to the jammer table perpendicular to the longitudinal axis and a bridge with a cradle.

Referring to FIG. 7, if desired a bridge 50 may be permanently or removably attached to the table 22 in addition to one or more pintle hooks 10. The bridge 50 may have two or more uprights 51 and an elevated joist 52 therebetween. In a first embodiment, the uprights 51 may be drilled and tapped from the bottom to accept threaded fasteners 15 through holes in the table 22. Alternatively and preferably, the uprights 51 are flanged, as shown. In a second embodiment, the flanges have through holes to accept threaded fasteners 15 for attachment to the table 22. The flanged embodiment prophetically provides the benefit of easier alignment of the flange holes with the table 22 holes.

The elevated joist 52 is disposed above the pintle hook 10 in the Z-direction, so that the pintle hook 10 is accessible for attaching and removing towing equipment. The joist 52 also protects the pintle hook 10 from falling debris as may occur in hostile environments. If desire, the bridge 50 may be closed on three sides to further protect the pintle hook 10 and other sensitive component disposed underneath the joist 52.

The joist 52 has a bottom joist 52 surface facing towards the table 22 and pintle hook 10 in the Z-direction and a top joist 52 surface opposed thereto. The top surface 23 of the joist 52 may have the aforementioned cradles 26 to accept complementary pylons, ordinance, electronics, engines, engine components, etc. for attachment to or removal from the underside of the aircraft wing. The embodiment of FIG. 7 provides the benefit that the cradle 26 may carry a munition 32 while the trailer 30 is still attached to the pintle hook 10.

In a hybrid embodiment, the flange holes of a bridge 50 may be sized to correspond to the holes of outboard trisections 42 of an adapter 40 so both may be used in conjunction. This arrangement provides the dual benefits of a bridge 50 to support the cradles 26 and an adapter 40 for ease of application of the pintle to the table 22.

In operation, the jammer 20 is driven to a site judged safe enough to carry out the next steps. The boom 21 is articulated to a position where table 22 is at an ergonomically appropriate height. The pintle hook 10 is attached to an adapter 40, if one is to be used. The adapter 40 is then attached to the table 22. Otherwise, the pintle hook 10 is directly attached to the table 22. Alternatively, the adapter 40 may be attached to the table 22 and the pintle hook 10 subsequently attached to the adapter 40. The jammer 20 is driven to the trailer 30 pickup location, if remote from the initial site. The boom 21 is extended and articulated as necessary for the pintle hook 10 to access the tow hitch of the trailer 30, accounting for any tow bar 31 which may be present. The boom 21 is particularly articulated to avoid interference with cargo on the trailer 30, the sides of the trailer 30, etc. The pintle hook 10 is attached to the hitch, either directly or through an intermediate connection, such as a tow bar 31. The jammer 20 then tows the trailer 30 to a desired first location for unloading and use of the cargo, such as a munition 32 to be attached to the underside of an aircraft wing. The boom 21 is articulated to an ergonomically comfortable position for manipulation of the cargo. The jammer 20 may then tow the trailer to the other wing of the aircraft for additional unloading and attachment of cargo at a second location. The towing process is repeated as necessary for other trailers 30. Additionally, the jammer 20 can tow other aviation ground equipment as needed.

All of the jammers 20 according to the present invention provide the benefit of serving dual purposes for both bobtail towing and loading/unloading munitions from an aircraft wing. The need for a bobtail is eliminated—and the space and weight that would be allocated to a bobtail can be redeployed for other needed supplies. Given that an Air Force bobtail can have a footprint of about 7 square meters and a weight of at least about 3800 kg., the savings in weight and cargo space is significant.

The present invention also provides the benefit that while the jammer 20 pulls the trailer 30 the jammer 20 is moving in its reverse direction. The operator is facing forward, towards the table 22. In contrast, the operator of a bobtail is facing away from the munitions 32 on the trailer. This present invention provides the benefit that it is now easier for the operator to monitor sensitive munitions 32 during transport.

What is claimed is:

1. A vehicle suitable for loading/unloading a munition to/from an underside of an aircraft wing and comprising:
    an articulable boom cantilevered from a proximal end to a distal end remote therefrom;
    a table juxtaposed with said distal end of said boom, said table being configured to have an upwardly extending cradle mounted thereto; and
    an upwardly extending pintle hook joined to said table.

2. A vehicle according to claim 1 wherein said pintle hook is removably joined to said table.

3. A vehicle according to claim 2, wherein said table defines an XY plane and a Z direction perpendicular thereto, said pintle hook extending in said Z direction and further comprising an adapter having three trisections, a central trisection intermediate two outboard trisections, said outboard trisections being joined to said table and said central trisection being spaced apart from said table in said Z direction, said pintle hook being removably joined to said central trisection of said adapter.

4. A vehicle according to claim 2, wherein said table has a top table surface defining an XY plane and a Z direction perpendicular thereto, said pintle hook extending in said Z direction and further comprising a bridge joined to said table, said bridge having at least two uprights and a joist therebetween, said joist being spaced apart from said top surface of said table and having a bottom joist surface facing said top table surface and a top joist surface opposed thereto, said joist being adapted to receive a cradle on said top joist surface and said pintle hook being directly joined to said table underneath said joist.

5. A table removably mountable to a distal end of a boom of a vehicle at four pivot points, said boom defining a longitudinal direction, said table comprising:
    a generally horizontal top table surface and a bottom table surface opposed thereto, said top table surface defining an XY plane and a Z direction perpendicular thereto, said table having four pivot points, said pivot points being disposed in two pairs on opposed sides of said table; and
    a pintle hook attached to said horizontal top table surface and extending upwardly therefrom in said Z direction, whereby said pintle hook is vertically and upwardly oriented when said table is horizontally mounted onto said boom of a said vehicle.

6. A table according to claim 5 further comprising an adapter having a cross section with three trisections, a central trisection and two outboard trisections extending symmetrically and outwardly therefrom, each said outboard trisection being joined to said outboard trisection, said central trisection being spaced outwardly from said top table surface in said Z direction, said pintle hook being attached to said central trisection of said adapter by threaded fasteners.

7. A table according to claim 6 wherein said table further comprises a plurality of table holes therethrough disposed in a pattern and said outboard trisections of said adapter having a plurality of adapter holes therethrough disposed in said pattern, whereby said adapter is removably attachable to said table by a plurality of threaded fasteners inserted through said holes and said pintle hook is attached to said adapter by a screw thread inserted into a tapped hole in said adapter.

8. A table according to claim 5 further comprising a bridge joined thereto, said bridge having at least two uprights and a joist therebetween, said joist being spaced apart from said top surface of said table and having a bottom joist surface facing said top table surface and a top joist surface opposed thereto, said joist being adapted to receive a cradle on said top joist surface and said pintle hook being directly joined to said table underneath said joist.

9. A table according to claim 8 wherein each said upright has an outwardly flange, said bridge being removably joined to said table by threaded fasteners through said flanges.

10. A table according to claim 9 wherein said joist has a top surface and an upstanding cradle joined thereto, said cradle being adapted to hold a munition.

11. A table according to claim 10 wherein said joist has a top surface and a plurality of upstanding cradles joined thereto, each said cradle being adapted to hold a munition.

12. A table according to claim 5 wherein said pintle hook is directly mounted onto said table and is generally parallel to said longitudinal axis.

13. A method of repositioning a trailer without the use of a bobtail, said method comprising the steps of:
    providing a vehicle having an outwardly extending boom, said boom extending from a proximal end to a distal end remote therefrom;
    extending said boom to a position ergonomically suitable for attaching accessories thereto;
    attaching a table to said boom, whereby said table is juxtaposed with said distal end of said boom;
    attaching a pintle hook to said table;
    driving said vehicle to a trailer, said trailer being disposed at a first location;
    attaching said trailer to said pintle hook; and
    without using a bobtail, driving said vehicle to a second location while towing said trailer behind said vehicle.

14. A method according to claim 13 further comprising the step of attaching an upstanding cradle to said table and disposing a munition thereon.

15. A method according to claim 14 further comprising the step of detaching said trailer from said pintle hook at said second location.

16. A method according to claim 15 further comprising the steps of driving said vehicle to a location juxtaposed with an aircraft; extending said boom to a position ergonomically suitable for removing said munition from said and removing said munition from said cradle for subsequent deployment.

17. A method according to claim 16 further comprising the step attaching said munition to a first wing of said aircraft.

18. A method according to claim 14 comprising the steps of attaching plural upstanding cradles to said table, and disposing a munition on each said upstanding table.

19. A method according to claim 18 comprising the step repositioning said vehicle and said trailer to a location juxtaposed with a second wing of said aircraft; removing a munition from said cradle and attaching said munition to said second wing of said aircraft.

20. A method according to claim 13 wherein said step of attaching said trailer to said pintle hook comprises the step of attaching a tow bar to said pintle hook and to a tow bar on said trailer, whereby said tow bar tautly extends therebetween during towing.

* * * * *